United States Patent [19]
Fujino et al.

[11] Patent Number: 5,263,458
[45] Date of Patent: Nov. 23, 1993

[54] FUEL FEEDER FOR AUTOMOTIVE ENGINE

[75] Inventors: Ryuji Fujino; Yasunobu Endo, both of Wako, Japan

[73] Assignee: Honda Giken Kogyo Kabushiki Kaisha, Tokyo, Japan

[21] Appl. No.: 968,420

[22] Filed: Oct. 29, 1992

[30] Foreign Application Priority Data

Oct. 31, 1991 [JP] Japan .................................. 3-311486

[51] Int. Cl.$^5$ ..................... F02M 37/00; B60K 15/077
[52] U.S. Cl. ..................................... 123/514; 137/574
[58] Field of Search ............... 123/509, 514, 516; 137/571, 574

[56] References Cited

U.S. PATENT DOCUMENTS

| | | | |
|---|---|---|---|
| 4,279,232 | 7/1981 | Schuster et al. | 123/514 |
| 4,694,857 | 9/1987 | Harris | 137/574 |
| 4,763,633 | 8/1988 | Nakanishi | 123/514 |
| 4,899,784 | 2/1990 | Woodgate et al. | 123/514 |
| 4,919,103 | 4/1990 | Ishiguro et al. | 123/514 |
| 4,928,657 | 5/1990 | Asselin | 123/514 |
| 4,971,017 | 11/1990 | Beakley et al. | 123/514 |
| 4,989,572 | 2/1991 | Giacomazzi et al. | 123/514 |
| 5,050,567 | 9/1991 | Suzuki | 123/514 |
| 5,107,889 | 4/1992 | Sasaki et al. | 123/514 |
| 5,127,432 | 7/1992 | Duhaime et al. | 137/574 |

FOREIGN PATENT DOCUMENTS 2460101 6/1976 Fed. Rep. of Germany ...... 123/514

Primary Examiner—E. Rollins Cross
Assistant Examiner—Thomas Moulis
Attorney, Agent, or Firm—Armstrong, Westerman, Hattori, McLeland & Naughton

[57] ABSTRACT

A fuel feeder for an automotive engine, which comprises a fuel tank with a sub-tank provided therein for feeding fuel from the sub-tank to an engine. Excess fuel returned from the engine is led to an overflow chamber disposed in the sub-tank and thence overflows into the sub-tank. Normally, the overflow chamber is thus full of returned fuel. When the fuel in the sub-tank is brought to one side due to a sudden acceleration or deceleration or a turning of the vehicle, the fuel in the overflow chamber is also brought to the same side and overflows from the overflow chamber, thus increasing fuel in the sub-tank.

7 Claims, 4 Drawing Sheets

5,263,458

FUEL FEEDER FOR AUTOMOTIVE ENGINE

BACKGROUND OF THE INVENTION

1. Field of the Invention

This invention relates to a fuel feeder for feeding liquid fuel from a fuel tank to an automotive engine and, more particularly, to a fuel feeder for an automotive engine, in which fuel is supplied from a sub-tank provided in the fuel tank.

2. Description of the Related Art

When a vehicle is suddenly accelerated or decelerated or when it suddenly turns, a great momentum is exerted to it in a longitudinal or transversal direction. In addition, when the vehicle runs along a slope, a gravitational force acts on the vehicle in longitudinal and transversal directions. In such situations, the liquid fuel contained in the fuel tank is forcibly brought to one side thereof. In such case, the effective head or liquid level in the fuel tank is lowered, and it is possible that the withdrawal port of a fuel pump which is disposed in the fuel tank is brought to be aloof from the liquid level. With the occurrence of the lack of fuel around the fuel pump withdrawal port, the fuel pump sucks air, thus reducing the pressure of fuel fed from the pump, that is, generating a phenomenon of engine breathing.

Accordingly, it has been thought to dispose a sub-tank on the bottom of the fuel tank and locate the fuel pump withdrawal port in the sub-tank, as shown in U.S. Pat. No. 4,397,333. In such a fuel feeder, withdrawal of fuel in the fuel tank into the sub-tank is caused by a jet of excess fuel which is returned from the engine to the fuel tank. With this fuel feeder, a sufficiently high liquid level can be held in the sub-tank even when the liquid level in the fuel tank is reduced. It is thus possible to prevent the fuel pump withdrawal port from getting aloof from the liquid level when the vehicle is suddenly accelerated or decelerated or when the vehicle runs along a slope.

With the above fuel feeder, however, it is necessary to use a jet pump to lead fuel in the fuel tank into the sub-tank, thus complicating the structure and increasing the cost. Usually, therefore, a fuel feeder is adopted, in which fuel in the fuel tank is led into the sub-tank without use of any jet pump.

FIG. 1 is a partly broken-away schematic perspective view showing a fuel tank of such a prior art fuel feeder.

The illustrated fuel tank has a fuel tank body 1, which accommodates a sub-tank 2 disposed on its bottom. The sub-tank 2 has a box-like shape open at the top. Around the sub-tank 2, a spiral or maze-like fuel passage 3 is provided to communicate the inside and outside of the sub-tank 2. With this arrangement, fuel contained in the tank body 1 is led into the sub-tank 2 due to a liquid level difference.

In the sub-tank 2, a fuel pump 4 is provided to pump out fuel into the engine. The pump 4 has its withdrawal port 5 also disposed in the sub-tank 2. The withdrawal port 5 is provided with a filter 6, which extends along the bottom of the sub-tank 2.

In the sub-tank 2 is also disposed a lower end outlet 8 of a return duct 7, through which excess fuel is returned from the engine to the sub-tank 2.

In the fuel feeder having this structure, fuel in the tank body 1 is led through the fuel passage 3 into the sub-tank 2. Fuel retained in the sub-tank 2 is withdrawn through the filter 6 and pumped out by the fuel pump 4. Excess fuel is returned from the engine through the return duct 7 into the sub-tank 2. As the liquid level in the sub-tank 2 is reduced by feeding fuel to the engine, fuel in the tank body 1 is led into the sub-tank 2 due to a liquid level difference that is produced. Thus, the liquid levels inside and outside the sub-tank 2 are held to be substantially equal.

When fuel in the tank body 1 is brought to one side thereof due to an exerted momentum or the like, a major portion of fuel in the sub-tank 2 is retained in the inside thereof. Thus, the possibility that the filter 6 provided on the withdrawal port 5 of the fuel pump 4 gets aloof from fuel is reduced to eliminate or alleviate the pressure reduction of fuel fed to the engine.

Meanwhile, blended fuel engines are recently considerably popular, which have an aim of low gasoline consumption and use blended fuel prepared by adding alcohol to gasoline. Such an engine requires an increased amount of fuel fed to it because the required consumption of 100% pure alcohol, for instance, is substantially double that of 100% pure gasoline. Therefore, if the above fuel feeder comprising the fuel tank provided with the sub-tank is to be used, it is necessary to accommodate a sufficiently increased amount of fuel in the sub-tank.

In the fuel feeder shown in FIG. 1, since fuel is led to the sub-tank 2 with the sole liquid level difference, if it is intended such that sufficient fuel is retained in the sub-tank 2 even when the liquid level in the fuel tank 1 is reduced, the sub-tank 2 should have a considerably large bottom area. However, by increasing the bottom area of the sub-tank 2, the following problem is posed.

FIG. 2 shows the case when the bottom area of the sub-tank 2 shown in FIG. 1 is increased.

While the vehicle is running normally, the filter 6 is held submerged in fuel even when the liquid level in the sub-tank 2 is reduced because the liquid level surface is held substantially horizontal. So far as this condition alone is concerned, increasing the bottom area of the sub-tank 2 leads to no problem. However, when fuel in the sub-tank 2 is brought to one side thereof due to sudden acceleration or deceleration or turning of the vehicle or running thereof along a slope, the liquid level surface is suddenly tilted, as shown in FIG. 2, resulting in a reduced contact area of the filter 6 with fuel. Therefore, the quantity of fuel withdrawn by the fuel pump 4 is reduced. This means that in spite of the provision of the sub-tank 2 the effective quantity of fuel fed to the engine is not substantially increased. That is, any benefits of the sub-tank 2 are substantially reduced.

It may be thought to increase the area of the filter 6. However, the filter area is limited by the withdrawal force of the fuel pump 4. Besides, even if the filter area is increased, an increase of the filter area exposed from the liquid level surface may result in air withdrawal. Therefore, increasing the filter area is not effective.

SUMMARY OF THE INVENTION

An object of the invention, which is intended in the light of the above problems, is to provide a fuel feeder for an automotive engine, which, while leading fuel in a fuel tank body through a fuel passage into a sub-tank to feed fuel therefrom to the engine, permits increasing in effect the quantity of fuel accommodated in the sub-tank without substantially increasing the bottom area of the sub-tank.

Another object of the invention is to provide a fuel feeder for an automotive engine, which permits stable feeding of fuel to the engine even when the vehicle is suddenly accelerated or decelerated or suddenly turns or runs along a slope.

To attain the above objects of the invention, an overflow chamber for receiving excess fuel returned from the engine is provided in the sub-tank. The overflow chamber has a box-like shape open at the top and is disposed such that it faces the outlet of an excess fuel return duct, and fuel overflows from the overflow chamber into the sub-tank.

With the above structure, excess fuel returned from the engine through the return duct is tentatively stored in the overflow chamber to overflow into the sub-tank.

Normally, a greater quantity of fuel than the maximum fuel consumption is fed to the engine, and thus a considerably great amount of fuel is returned through the return duct to the overflow chamber. While the vehicle is running normally, the overflow chamber is thus full of fuel at all times.

When the vehicle is suddenly accelerated or decelerated or turns or runs along a slope, the liquid level surface in the overflow chamber is tilted to cause fuel to overflow therefrom. The overflow fuel increases the quantity of fuel in the sub-tank so as to increase the liquid level therein. Thus, irrespective of the tilting of the liquid level caused as a result of bringing fuel in the sub-tank to one side thereof, the liquid level can be held above the fuel pump withdrawal port. In this way, the necessary quantity of fuel to be withdrawn by the fuel pump can be secured for stable feeding of fuel to the engine.

In a preferred embodiment of the invention, the top of the sub-tank is covered by a lid having opening. This arrangement has an effect of preventing fuel in the sub-tank from being forced out by fuel suddenly overflowing from the overflow chamber due to sudden acceleration or deceleration or sudden turning of the vehicle.

The above and other objects, features and advantages of the present invention will become apparent from the following description of the preferred embodiment, taken in conjunction with the accompanying drawings.

DESCRIPTION OF THE PREFERRED EMBODIMENTS

Figure 1:
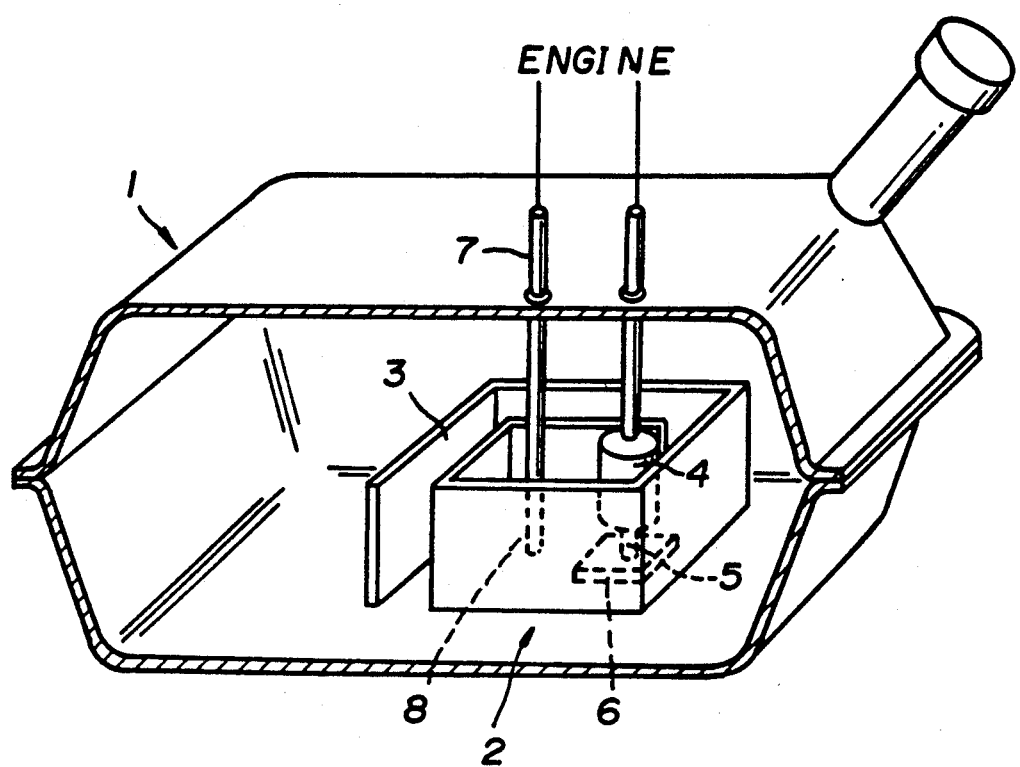
FIG. 1 is a partly broken-away schematic perspective view showing a fuel tank of a prior art fuel feeder for an automotive engine.
Figure 2:
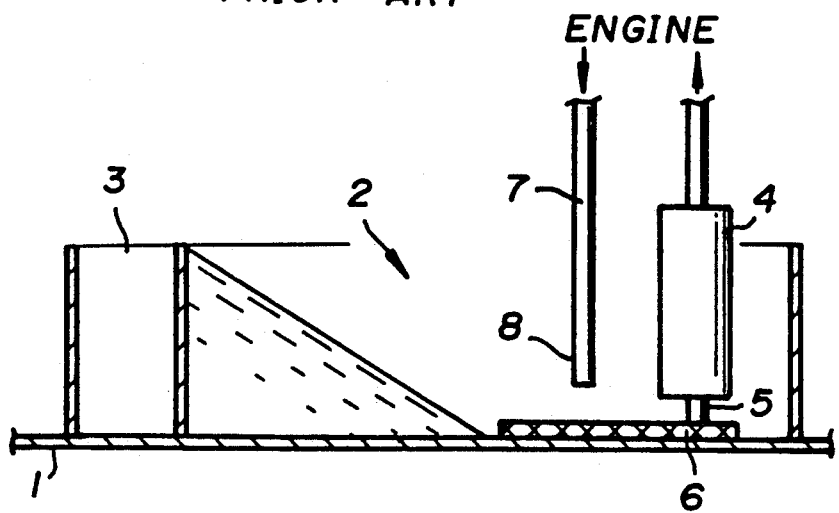
FIG. 2 is a schematic sectional view for explaining a problem when the bottom area of a sub-tank in the fuel feeder shown in FIG. 1 is increased.
Figure 3:
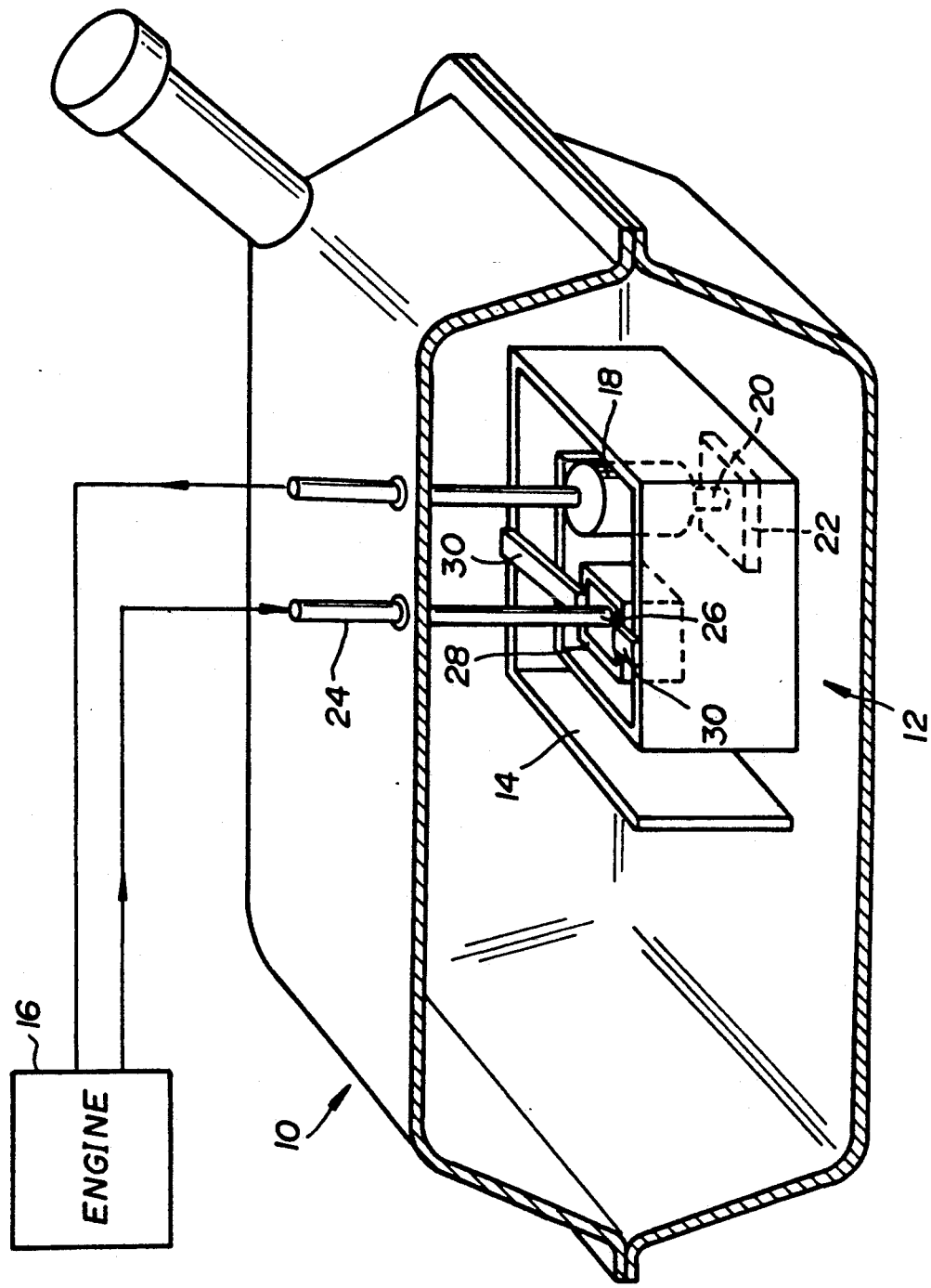
FIG. 3 is a partly broken-away schematic perspective view showing a fuel tank in an embodiment of the fuel feeder for an automotive engine according to the invention.

FIG. 3 shows a fuel feeder for an automotive engine according to the invention. The fuel feeder has a fuel tank body 10 in the form of a sealed vessel. The tank body 10 is mounted in the vehicle body such that its left side in the Figure corresponds to the front of the vehicle. The tank body 10 accommodates a sub-tank 12 disposed on its bottom. The sub-tank 12, like that in the prior art fuel feeder described before, has a box-like shape open at the top. Around the sub-tank 12, a helical or maze-like fuel passage 14 is provided to communicate the inside and outside of the sub-tank 12. In the sub-tank 12 and rearwardly of the inside thereof, a fuel pump 18 is disposed for pumping out fuel to the engine 16. The fuel pump 18 has its withdrawal port 20 provided with a filter 22. The filter 22 extends along the bottom of the sub-tank 12. It passes fuel through it to the withdrawal port 20 of the fuel pump 18, and also it has a role of removing foreign particles such as dust particles from the liquid fuel to prevent foreign particles from being introduced into the fuel feed duct.

In the sub-tank 12 and at a forward position thereof, a lower end outlet 26 of a return duct 24 is disposed, through which excess fuel returning from the engine 16 is led. The return duct 24 has an upper portion supported by the tank body 10. An overflow chamber 28 is provided such that it faces the lower end outlet 26 of the return duct 24. The overflow chamber 28 is supported by support members 30 extending from the top of the sub-tank 12 to it such that it is spaced apart from the bottom and side walls of the sub-tank 12.

The operation of the automotive engine fuel feeder having the above construction will now be described.

While the vehicle is running normally, the liquid level surface in the fuel tank body 10 is substantially horizontal. Thus, fuel flows through the fuel passage 14 into the sub-tank 12 due to a liquid level difference. In the sub-tank 12, the liquid level surface is also substantially horizontal and held at the same level as the external liquid level surface, as shown by the double-dash-and-bar line in FIG. 4. Thus, even if fuel is reduced, the filter 22 remains submerged in the fuel in the sub-tank 12. Fuel is thus led through the filter 22 and the withdrawal port 20 of the fuel pump 18. It is thus withdrawn and pumped out to the engine 16 by the fuel pump 18.

Excess fuel in the engine 16 is returned through the return duct 24 into the fuel tank body 10. With the overflow chamber 28 provided such that it faces the lower end outlet 26 of the return duct 24, the excess fuel returning from the engine is tentatively stored in the overflow chamber 28. The engine 16 is fed with a greater quantity of fuel than its maximum consumption quantity, and a great quantity of excess fuel is returned from the engine 16. Normally, the overflow chamber 28 is thus full of fuel at all times. Consequently, the fuel led through the return duct 24 overflows from the overflow chamber 28. In this way, the excess fuel is returned from the engine 16 into the sub-tank 12.

Figure 4:
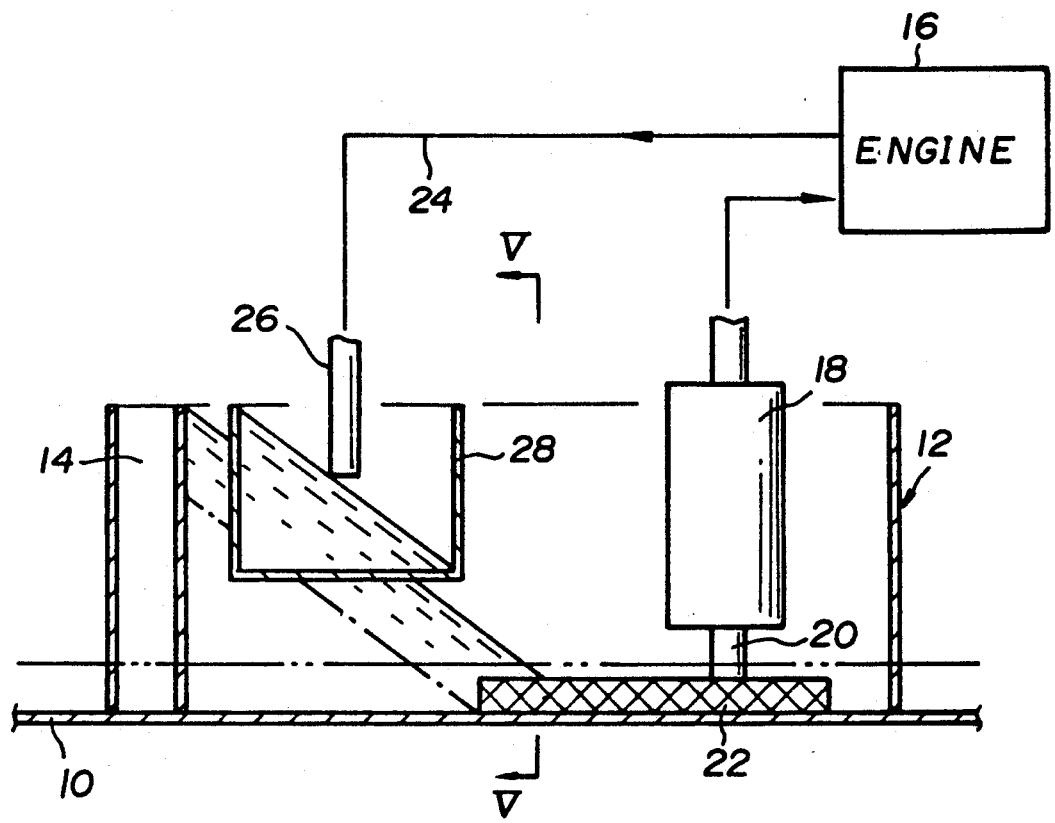
FIG. 4 is a schematic sectional view showing a sub-tank in the fuel feeder shown in FIG. 3 for explaining the operation.

When the vehicle is suddenly decelerated, the fuel in the sub-tank 12 is brought due to its momentum forward in the vehicle running direction, and the liquid level surface is thus tilted rearwardly downwardly as shown by the single-dash-and-bar or solid line in FIG. 4. In FIG. 4, the single-dash-and-bar and solid lines show the liquid level surface in the sub-tank 12 not provided and provided with the overflow chamber 28, respectively.

With the sub-tank 12 not provided with the overflow chamber 28, in response to a sudden deceleration of the vehicle with little fuel present in the fuel tank body 10 the liquid level surface in the sub-tank 12 is brought to a status as shown by the one-dash-and-bar line in FIG.

4. In this case, the filter 22 becomes separated from the liquid level surface. As a result, the supply of fuel from the fuel pump 18 to the engine 16 is cut.

With the sub-tank 12 provided with the overflow chamber 28, like the fuel in the sub-tank 12 the fuel in the overflow chamber 28 is tilted due to its momentum. Since the overflow chamber 28 is normally full of fuel returned through the return duct 24 as noted above, the tilting of the liquid level surface in the overflow chamber 28 causes overflow therefrom of fuel into the sub-tank 12, thus increasing the quantity of fuel in the sub-tank 12. The liquid level in the sub-tank 12 is thus increased correspondingly. Besides, if the overflow chamber 28 is disposed such that it is partly immersed in fuel at this time as shown, the overflow chamber 28 forces away the fuel in the sub-tank 12, thus further increasing the liquid level surface in the sub-tank 12. Thus, the tilted liquid level surface as shown by the solid line in FIG. 4 is brought about.

Thus, even when the liquid level surface is tilted due to a deceleration of the vehicle, the filter 22 is held in contact with fuel, thus reliably maintaining the supply of fuel to the engine 16.

When the vehicle is suddenly accelerated, the fuel in the sub-tank 12 is brought rearward in the vehicle running direction to cause forwardly downward tilting of the liquid level surface. However, since the withdrawal port 20 of the fuel pump 18 and the filter 22 are provided in the sub-tank 12 at rearward positions thereof, the filter 22 does not become separated from fuel.

Figure 5:
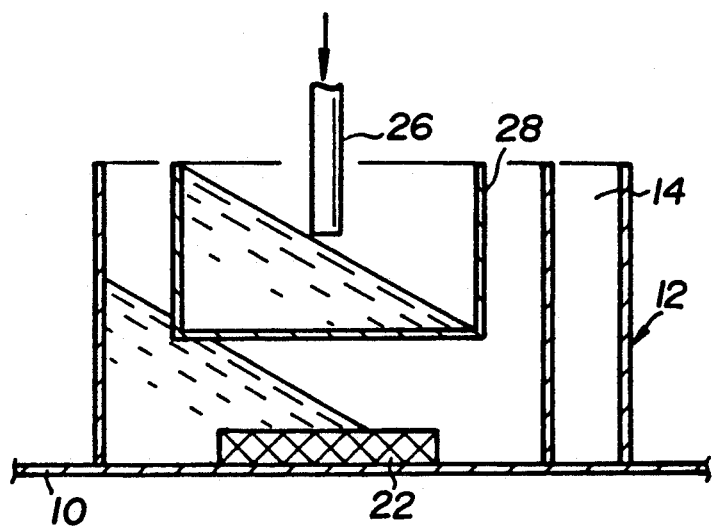
FIG. 5 is a section taken along line V—V in FIG. 4, showing the fuel feeder in a different operating state.

When the vehicle suddenly turns, the fuel in the sub-tank 12 is brought toward the side opposite the turning direction, and the liquid level surface is thus tilted such as shown in FIG. 5. Again in this case, with the provision of the overflow chamber 28, the fuel level in the sub-tank 12 is increased to ensure sufficient area of contact between the filter 22 and fuel, that is, to ensure sufficient supply of fuel from the fuel pump 18 to the engine 16.

The acceleration, deceleration and turning of the vehicle occur repeatedly during the running thereof, and whenever such situation occurs, the fuel in the overflow chamber 28 is supplied to the sub-tank 12. This means that the capacity of the sub-tank 12 is increased in effect.

Figure 6:
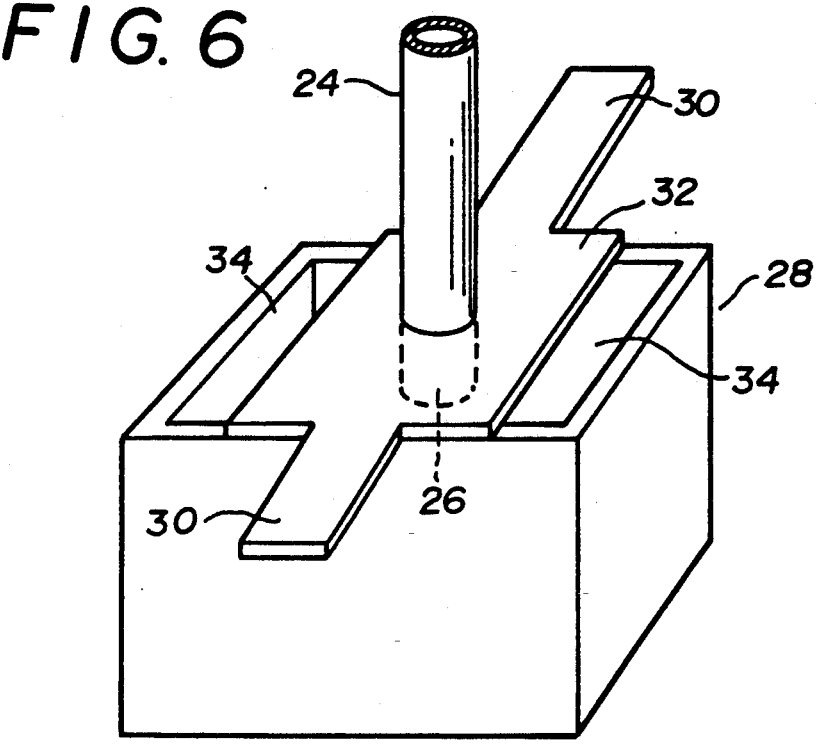
FIG. 6 is a perspective view showing an overflow chamber in a different embodiment of the fuel feeder for an automotive engine according to the invention.
Figure 7:
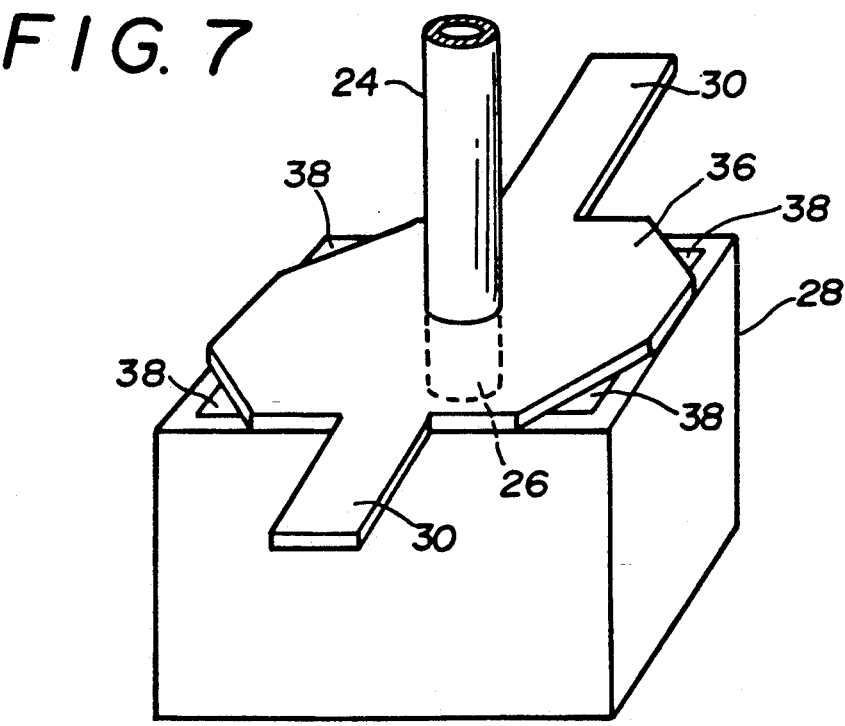
FIG. 7 is a view similar to FIG. 6 but showing a modification of the embodiment shown in FIG. 6.

FIGS. 6 and 7 are perspective views showing an essential part of respective modifications of the above embodiment of the automotive engine fuel feeder according to the invention.

In the modification shown in FIG. 6, the top of overflow chamber 28 is covered by a lid 32. The lid 32 has a smaller longitudinal dimension than that of the overflow chamber 28, and thus it forms a front and a rear transversal slit-like opening 34. The return duct 24 penetrates the lid 32, and its lower end outlet 26 is located in the overflow chamber 28. Thus, the lower end portion of the return duct 24 is fixedly supported by the lid 32.

In the modification shown in FIG. 7, the top of overflow chamber 28 is covered by a lid 36, which is chamfered at its four corners, thus forming comparatively small openings 38 at the corners.

With the provision of the lid 32 or 36 defining the openings 34 or 38, a resistance is offered to the fuel overflowing from the overflow chamber 28. This has an effect of preventing the fuel in the overflow chamber 28 from rushing out to strike and force or flick out the fuel in the sub-tank 12 at the time of a sudden turning or a sudden acceleration or deceleration of the vehicle. Thus, the fuel supply from the sub-tank 12 can be increased reliably. In addition, the lid can suppress overflow of fuel from the overflow chamber 28 due to vibrations exerted thereto during running of the vehicle. The overflow chamber 28 thus can be held in the full-of-fuel state at all times.

While some preferred embodiments of the invention have been described, they are by no means limitative, and various changes and modifications are possible without departing from the scope of the invention as set forth in the appended claims.

For example, the sub-tank 12 may be disposed in the tank body 10 transversally in lieu of the longitudinal disposition. Also, the overflow chamber 28, which has been disposed longitudinally in the sub-tank 12 in the above embodiments, may be disposed in the converse longitudinal positional relation to the fuel pump 18 as well. Further, it is possible to dispose the overflow chamber 28 in close contact with the bottom of the sub-tank 12. Further, the helical or maze-like fuel passage 14, which has been used to communicate the space in the fuel tank body 10 and the space in the sub-tank 12 in the above embodiments, may be replaced with, for instance, an opening provided with a check valve, which blocks the flow-out of fuel from the sub-tank 12.

As has been made apparent from the foregoing, according to the invention the overflow chamber is provided in the sub-tank to let excess fuel in the engine be returned to it. Thus, when the liquid level in the fuel tank is reduced and also in this state the liquid level surface is tilted due to a sudden acceleration or deceleration or turning of the vehicle or running thereof along a slope, it is possible to increase the liquid level in the sub-tank to let fuel be withdrawn reliably by the fuel pump. Thus, it is possible to stably secure the fuel to be fed to the engine and effectively eliminate the phenomenon of the engine breathing.

Further, with the overflow chamber it is possible to secure the necessary quantity of fuel stored in the sub-tank at all times. Thus, it is possible to permit increasing the effective fuel quantity in effect without increasing the size of the sub-tank and saving the fuel tank space.

What is claimed is:

1. A fuel feeder for an automotive engine comprising:
    a fuel tank for accommodating liquid fuel;
    a sub-tank disposed in said fuel tank and having a fuel passage, fuel in said fuel tank being led through said fuel passage into said sub-tank;
    a fuel pump having an inlet port disposed in said sub-tank for pumping fuel in said sub-tank to an engine;
    a return duct having an outlet disposed in said sub-tank, excess fuel in said engine being returned through said return duct in said sub-tank; and
    an overflow chamber fixedly disposed in said sub-tank such that it faces said outlet of said return duct, said overflow chamber having an open top positioned above the fuel level in said subtank when said fuel tank is partially full of fuel, excess fuel returned from said engine being received in said overflow chamber and overflowing into said sub-tank.

2. The fuel feeder for an automotive engine according to claim 1, wherein said overflow chamber is disposed such that the walls of said overflow chamber are in contact with fuel in said sub-tank when said fuel is brought to one side of said sub-tank.

3. The fuel feeder for an automotive engine according to claim 1, wherein said overflow chamber is disposed within and near the forward end of said sub-tank, while said inlet part of said fuel pump is disposed within and near the rearward side of said sub-tank.

4. The fuel feeder for an automotive engine according to claim 1, wherein the top of said overflow chamber is covered by a lid which forms openings through which fuel in said overflow chamber overflows into said sub-tank.

5. The fuel feeder for an automotive engine according to claim 4, wherein said lid defines slit-like openings at the top of said overflow chamber.

6. The fuel feeder for an automotive engine according to claim 4, wherein said lid is chamfered at its four corners so as to form said openings at four corners of the top of said overflow chamber.

7. The fuel feeder for an automotive engine according to claim 4, wherein said outlet of said return duct is fixedly supported by said lid.

* * * * *